(12) United States Patent
Nerst et al.

(10) Patent No.: US 9,100,200 B2
(45) Date of Patent: Aug. 4, 2015

(54) VIDEO AUGMENTED TEXT CHATTING

(75) Inventors: Alex Nerst, Ashdod (IL); Avi Shechter, Ramot Hashavim (IL)

(73) Assignee: GENBAND US LLC, Frisco, TX (US)

( * ) Notice: Subject to any disclaimer, the term of this patent is extended or adjusted under 35 U.S.C. 154(b) by 221 days.

(21) Appl. No.: 13/701,526

(22) PCT Filed: May 15, 2011

(86) PCT No.: PCT/IB2011/052121
§ 371 (c)(1),
(2), (4) Date: Mar. 10, 2013

(87) PCT Pub. No.: WO2011/151751
PCT Pub. Date: Dec. 8, 2011

(65) Prior Publication Data
US 2013/0162750 A1 Jun. 27, 2013

Related U.S. Application Data

(60) Provisional application No. 61/350,026, filed on Jun. 1, 2010.

(51) Int. Cl.
*H04N 7/14* (2006.01)
*H04L 12/18* (2006.01)
*G06Q 10/10* (2012.01)
*H04L 29/06* (2006.01)

(52) U.S. Cl.
CPC .......... *H04L 12/1827* (2013.01); *G06Q 10/107* (2013.01); *H04L 65/4015* (2013.01); *H04N 7/141* (2013.01)

(58) Field of Classification Search
CPC ......... H04N 7/141; H04N 7/14; H04N 7/144; H04N 7/147; H04N 7/148; H04N 7/15; H04N 7/152; G06Q 10/107; H04L 64/4015; H04L 12/1827
USPC ............. 348/14.01–14.16; 709/204; 715/752, 715/753, 756; 455/414.1, 426.1
See application file for complete search history.

(56) References Cited

U.S. PATENT DOCUMENTS

| | | |
|---|---|---|
| 2002/0073150 A1 | 6/2002 | Wilcock |
| 2003/0074451 A1 | 4/2003 | Parker et al. |
| 2005/0143053 A1 * | 6/2005 | Virtanen et al. ........... 455/414.1 |
| 2007/0216762 A1 | 9/2007 | Toiyama |
| 2007/0268312 A1 | 11/2007 | Marks et al. |
| 2008/0022297 A1 * | 1/2008 | Walter et al. .................... 725/25 |
| 2009/0005089 A1 * | 1/2009 | Paik et al. ..................... 455/466 |
| 2009/0119709 A1 * | 5/2009 | Kim et al. ........................ 725/39 |
| 2009/0271705 A1 * | 10/2009 | Sheng et al. .................. 715/733 |
| 2009/0286515 A1 | 11/2009 | Othmer |
| 2009/0298548 A1 * | 12/2009 | Kim et al. ...................... 455/566 |
| 2009/0316688 A1 * | 12/2009 | Meenavalli ................... 370/352 |
| 2010/0058445 A1 * | 3/2010 | Zhu .................................. 726/4 |
| 2010/0208030 A1 * | 8/2010 | Kim et al. .................. 348/14.02 |
| 2010/0267369 A1 * | 10/2010 | Lim et al. ................... 455/414.1 |
| 2011/0126258 A1 * | 5/2011 | Emerson et al. ............. 725/133 |

* cited by examiner

*Primary Examiner* — Melur Ramakrishnaiah
(74) *Attorney, Agent, or Firm* — Haynes and Boone, LLP

(57) ABSTRACT

A method and a system for initiating a video session between parties while the parties are engaged in a text chat session. The method includes the steps of: reaching consent between the parties to engage in a video session while in a text chat session; identifying user activity associated with the text chat session; and automatically activating a video session with the other party when the user is actively associated with the text chat session.

20 Claims, 3 Drawing Sheets

VIDEO AUGMENTED TEXT CHATTING

CROSS-REFERENCE TO RELATED APPLICATIONS

This application is a U.S. National Phase Application under 35 U.S.C. 371 of PCT International Application No. PCT/IB2011/052121, which has an international filing date of May 15, 2011, and which claims the priority benefit of U.S. Provisional Patent Application No. 61/350,026, filed on Jun. 1, 2010, which is incorporated herein by reference.

FIELD OF THE INVENTION

The present invention relates to near real-time communication in one medium, which is augmented with a real-time or near real-time communication in another medium. More particularly but not exclusively, the present invention relates to text messaging, also known as text chat and/or instant messaging, which is augmented by video streaming calling.

BACKGROUND OF THE INVENTION

Text messaging, instant messaging and text chat are known in the art and is a very popular communication medium for both desktop computers and mobile terminals. Video calling and similar communication technologies are also well known in the art. The combination of text and video as well as multimedia messaging are also known and used.

Methods for creating messages of various media types are known, including automatic or semiautomatic triggering of message creation. Such methods usually invoke a message of the type associated with the triggering event. For example, keystrokes may trigger a text message while sound may trigger a voice message. U.S. patent application 20090286515 is believed to represent the state of the art in this respect.

The limitation on all types of combination of text and video, or another media combination, is that the combined media communication should be predetermined and prearranged to take place.

There is thus a widely recognized need for, and it would be highly advantageous to have, a method and a system for devoid of the above limitations.

SUMMARY OF THE INVENTION

According to one aspect of the present invention there is provided a method for a video augmented text chat session including the initiation of a video call session between at least two parties while the parties are engaged in a text chat session. The method includes the steps of: reaching consent between the parties to engage in a video session while in a text chat session; identifying user activity associated with the text chat session; automatically activating a video call session with the other party while the user is actively associated with the text chat session.

According to another aspect of the present invention there is provided a method for a video augmented text chat session where the step of activating the video conference session is executed when both the parties are actively associated with the text chat session.

According to another aspect of the present invention there is provided a method for a video augmented text chat session while the parties are engaged in a text chat session, the method including:
  reaching consent between the parties to engage in a video session while in a text chat session;
  performing at least one of:
    identifying user activity associated with the text chat session;
    initiating video recording associated with the text chat session; and
    sending the video recording in parallel to a text message associated with the text chat session; and
  receiving a text message and a video recording associated with the text chat session;
  identifying user activity associated with the text chat session; and
  displaying the video recording in parallel with the user activity.

According to yet another aspect of the present invention there is provided a wireless communication device for a video augmented text chat session including: a display, a front camera, and means for entering text; a wireless communication unit operative to communicate text transmissions and video transmissions; a processor for executing a text communication module and a video communication module, where the text communication module being operative to communicate the text transmissions with a user via a first part of the display and the video communication module being operative to communicate the video transmissions with a user via a second part of the display; where the video communication module being operative to automatically display video transmission received from a second terminal when the user is engaged in text chat communication with the second terminal.

According to still another aspect of the present invention there is provided a wireless communication device for a video augmented text chat session where the processor is operative to activate the video communication module automatically when the user is engaged in text communication with a second user with whom video over text messaging was initiated in the past.

Further according to another aspect of the present invention there is provided a wireless communication device for a video augmented text chat session where the engagement in text communication includes at least one of: detecting the user moving the terminal; detecting the user using the terminal to enter text; detecting the user's face in a picture taken by the camera; and detecting a terminal wakeup.

Still further according to another aspect of the present invention there is provided a wireless communication device for a video augmented text chat session additionally including storage operative to store video and where the video communication module is operative to: store the video transmission received from the second terminal; and retrieve and display the stored video when the user is engaged in text communication with the second terminal.

Even further according to another aspect of the present invention there is provided a wireless communication device for a video augmented text chat session additionally including an icon, displayable on the display, representing at least one of: a device being capable of video augmented text session; and a device being engaged in a video augmented text session.

Additionally according to another aspect of the present invention there is provided a wireless communication device for a video augmented text chat session where the icon represents a status associated with the device and another device with which the device is currently communicating.

Also according to another aspect of the present invention there is provided a server operative to store and forward video transmissions, the server communicating with two the wireless communication device of claims and operative to receive the video transmission for one of the wireless communication device and to forward the video transmission to the other wireless communication device upon demand.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE INVENTION

Figure 1:
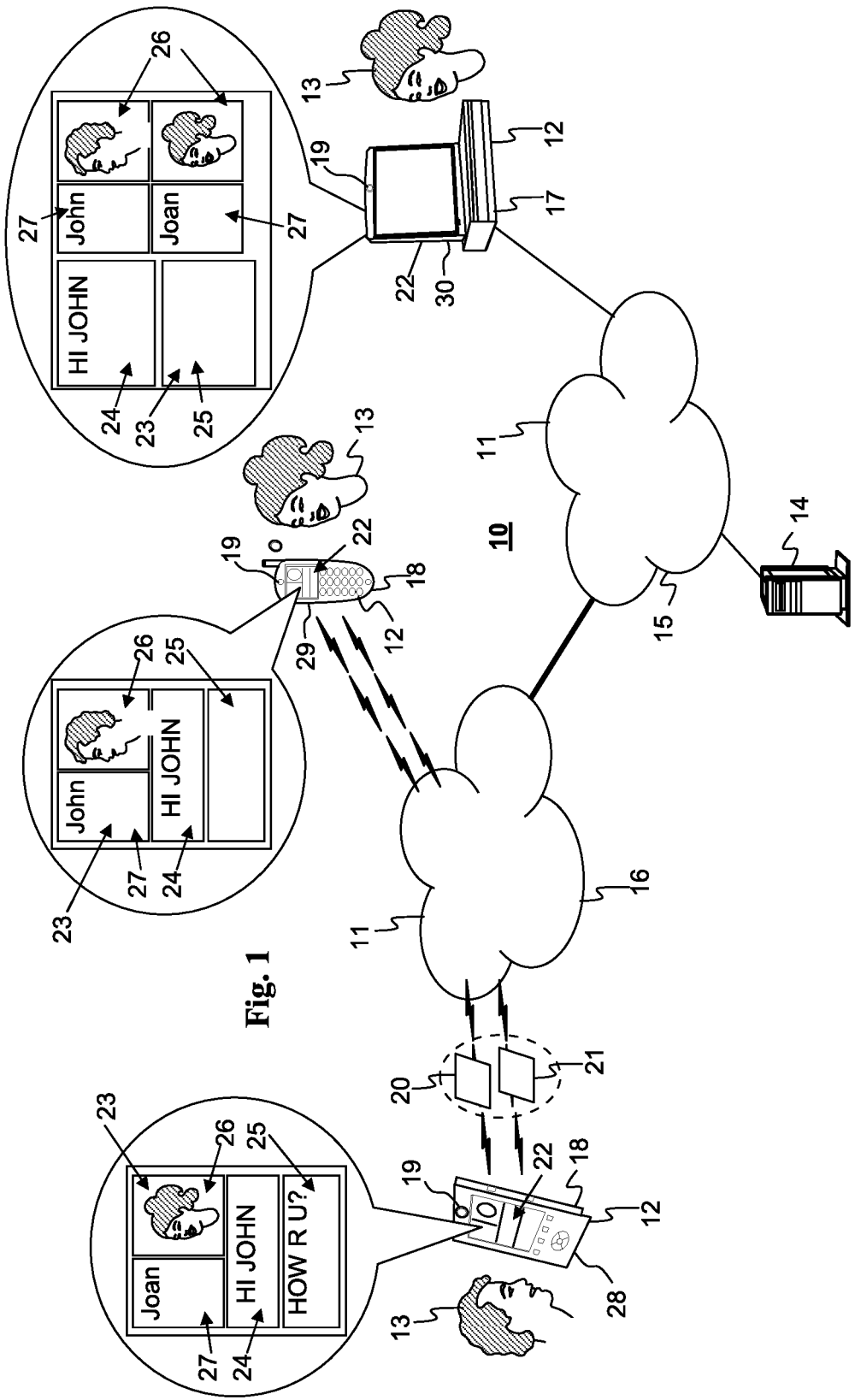
FIG. 1 is a simplified illustration of a media-augmenting communication network.

The principles and operation of video augmented text messaging according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text has the same use and description as in the previous drawings where it was described.

The present invention relates to near real-time communication in one medium, which is augmented with a real-time or near real-time communication in another medium. More particularly but not exclusively, the present invention relates to text messaging, also known as text chat and/or instant messaging, which is augmented by video streaming or video messaging. However, other combinations of media are also contemplated. Particularly, the initiation of the augmenting medium, which is the video media in this case, is triggered by the augmented medium, which in this case is the text messaging medium. Further, the exchange of the augmenting medium, which is the video media in this case, is conditioned on prior agreement between the communicating parties. Specifically, if the communicating parties have previously agreed to augment their communication, the system automatically invokes the augmenting medium when the augmented medium is triggered.

Text messaging, text chat and instant messaging may be used interchangeably unless the difference is described for a particular issue. Similarly, video call, video streaming, video messaging or video session may be used interchangeably unless the difference is described for a particular issue.

Reference is now made to FIG. 1, which is a simplified illustration of a media-augmenting communication network 10 according to a preferred embodiment of the present invention.

As shown in FIG. 1, the media-augmenting communication network 10 preferably includes at least one communication network 11 serving a plurality of media-augmenting communication devices 12 (hereinafter terminals 12) operated by users 13. The media-augmenting communication network 10 includes at least one communication sever 14. The communication networks 11 may include a wired communication network such as communication network 15 and/or a wireless communication network such as communication network 16. Respectively, the communication terminals 12 may be fixed or portable terminals such as desktop terminal 17 connected to the wired communication network 15, or mobile or wireless terminals such as wireless terminals 18 connected to the wireless communication network 16.

Communication networks 11 can be telephone networks (e.g. PSTN) cellular networks (e.g. PLMN, GPRS, 3G, 4G, etc.), WiMAX networks, satellite communication networks, WLAN (e.g. WiFi), PAN (e.g. Bluetooth), MAN, WAN, computer communication network (e.g. Ethernet, IP, etc.) the Internet, etc.

Terminals 12 are preferably capable of communicating in at least two media. Particularly, the terminals 12 are capable of instant messaging and video. Preferably, the terminals 12 are equipped with video cameras 19, preferably mounted at the front of the terminals 12 to capture video images of their respective users 13.

As shown in FIG. 1, the terminals 12 preferably exchange both text transmissions 20 (and/or text content and/or text messages as necessary) and video transmissions 21 (and/or video content and/or video messages as necessary).

It is appreciated that the text transmission 20 and the video transmission 21 are sent as independently media, but are associated with each other, and also associated with and/or triggered by the user's activity and/or engagement in one of the media, and particularly the creation of the text transmission 20.

Preferably, the terminals 12 include displays 22 displaying screens 23 for communicating information such as text and video. Preferably, the screens 23 include text-messaging area for incoming messages 24 and outgoing messages 25, video exchange area 26 and information area 27, preferably presenting information about the communicating users 13.

As shown in FIG. 1, video augmented text messaging can be provided between two parties as shown with respect to terminals 28 and 29, or with a larger group of users as shown with respect to terminal 30. Preferably, the video augmented text messaging session consists of two sessions taking place simultaneously. A first session, which is the augmented session, uses a first medium such as text messaging, presented in FIG. 1 by text content 20. A second session, which is the augmenting session, uses a second medium such as video, presented in FIG. 1 by video content 21. The video session can include streaming video or video messages.

Preferably, a video session is initiated between the parties only while the parties are engaged in a text chat session. Preferably, the parties agree to engage in the video session before the video session begins. Preferably, if two (or more) users have agreed to use video augmented text chat, this agreement holds whenever these two (or more) users engage in a text chat.

Preferably, a video recording process starts automatically when a terminal 12 identifies a user's 13 activity associated with the text chat session. The video recording process may start automatically only in the terminal that identifies the user's activity or in all the terminals involved in the video augmented text chat session. Alternatively, a video session is activated when both parties are actively associated with the text chat session.

The media-augmenting communication network 10, preferably, the terminals 12, initiate the augmenting video session between parties while the parties are engaged in the augmented text chat session. The augmenting medium initiation process includes:
  reaching consent between the parties to engage in a video session while in a text chat session;
  performing at least one of:
    identifying user activity associated with the text chat session;
    initiating video recording associated with the text chat session; and
    sending the video recording in parallel to a text message associated with the text chat session; and
  receiving a text message and a video recording associated with the text chat session;
  identifying user activity associated with the text chat session; and
  displaying the video recording in parallel with the user activity.

Figure 2:
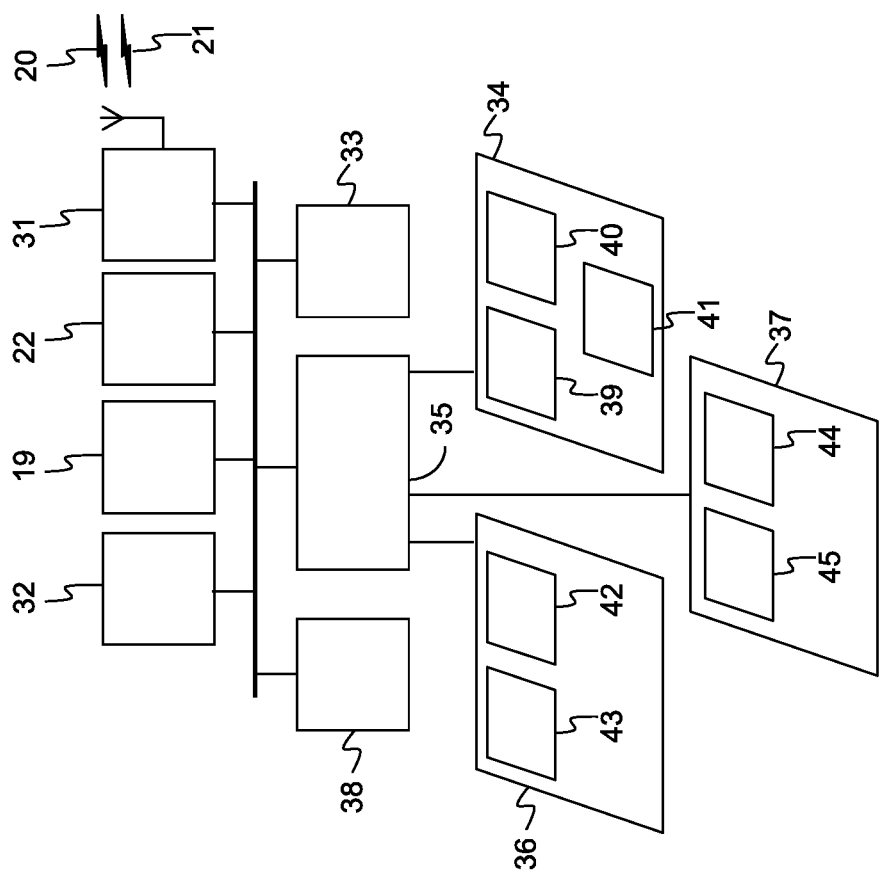
FIG. 2 is a simplified block diagram of media-augmenting terminal for the media-augmenting communication network.

Reference is now made to FIG. 2, which is a simplified block diagram of media-augmenting terminal 12 for a media-augmenting communication network 10 according to a preferred embodiment of the present invention.

As seen in FIG. 2, the media-augmenting terminal 12 includes the following units:
  A communication unit 31 for wired or wireless communication in the media-augmenting communication network 10 and preferably operative to communicate at least text transmissions 20 and video transmissions 21.
  A display 22, a front camera 19 and a text-entering device 32 such as a keyboard, a stylus, and/or a touch sensitive screen;
  A processor 33 for executing a media-augmenting software program 34.
  A memory or storage 35 for storing the software program 34, augmented content 36, and augmenting content 37.
  Optionally, one or more devices 38 for detecting user activity and/or location, such as accelerometer, GPS, etc.

The software program 34 preferably includes a text communication module 39, a video communication module 40 and a video augmentation module 41. The text communication module 39 preferably communicates the text transmissions with a user, preferably by operating the text-entering device 32 and a part of the display 22. The video communication module 40 preferably communicates video transmissions with the user, preferably by operating the camera 19 and another part of the display 22. The video augmentation module 41 preferably performs the following steps:
  Reaching consent between said parties to engage in a video session while in a text chat session.
  Identifying user activity associated with said text chat session.
  Automatically activating a video call session with said other party while said user is actively associated with said text chat session.

The augmented content 36 preferably contains received content 42 and sent content 43 (including content in preparation to be sent). The augmented content 36 preferably contains text content (text transmissions, text chat, text messages, etc., as relevant)

The augmenting content 37 preferably contains received content 44 and sent content 45 (including content in preparation to be sent). The augmented content 36 preferably contains video content (video transmissions, video chat, video messages, etc., as relevant)

The video communication module 40 preferably automatically creates augmenting content 37, such as video transmissions, when the user is engaged in text chat communication with the second terminal. The video communication module 40 may send (stream) the video content immediately as it is created. Alternatively, the video communication module 40 may store the video content in the memory 35 and send it later. For example, the video communication module 40 may send the video content as a video message.

The video communication module 40 preferably automatically displays augmenting content 37, such as video transmissions received from a second terminal, when the user of the first terminal is engaged in text chat communication with the second terminal. Preferably, the video communication module 40 stores the received video transmission in the memory 35 and retrieves it for display when the user is engaged in text chat communication with the second terminal. Alternatively, the video communication module 40 displays the received video transmission as it is received. Hence, the augmenting content, that is the video content, is created, transmitted and/or presented in real-time or near real-time.

Preferably, the processor 33 is operative to activate the video communication module 40 automatically when the user is engaged in text communication with a second user with whom video over text messaging was initiated in the past.

Optionally but preferably, if two or more users agreed to use media augmented communication such as video augmented text messaging, this consent holds for these users until it is revoked by a consenting user. This means that, for example, if users Joan and John agreed once to enter into video augmented text messaging, the next time John and Joan enters text messaging the system (that is the media-augmenting communication network 10, and/or the media-augmenting communication terminals 12, and/or the media-augmenting software program 34) automatically initiates media augmentation. For example, augmenting text chat with video content as described above.

Initiating content augmentation preferably include, for example: creating and/or capturing and/or recording video content and/or displaying video content. Detecting user activity for initiating content augmentation includes at least one of:

detecting the user moving the terminal;
  detecting the user using the terminal to enter text; and
  detecting the user's face in a picture taken by the camera;
  detecting a terminal wakeup.

Preferably, the terminals 12 exchange the augmenting content (such as the video content) directly. Alternatively, the sending terminal 12 sends the augmenting content to the server 14 of FIG. 1, and the receiving terminal 12 retrieves the augmenting content from the server 14. Preferably, the receiving terminal 12 retrieves the augmenting content from the server 14 when it detects user activity associated with the augmented medium, such as text chat. Hence, the server 14 is preferably operative to store and forward (or relay) the augmenting medium, such as video transmissions. The server 14 is preferably operative to communicate with the terminals 12, to receive the video transmission for one of the terminals 12 and to forward the video transmission to the other terminals 12 upon demand.

Preferably, the terminal 12 is capable of displaying on the display 22 an icon representing video augmented text session. The icon preferably represents a device being capable of video augmented text session (capability icon). A modification of the icon, or a different icon, represents a device being engaged in a video augmented text session (engagement icon). Particularly, the icon represents a status associated with the present terminal 12 and another terminal 12 with which said present 12 is currently communicating. Specifically, when the user is engaged in text chat with a particular terminal (or user) the terminals display the icon representing the video augmented capability and/or activity (engagement) for these two (or more) terminals.

Figure 3:
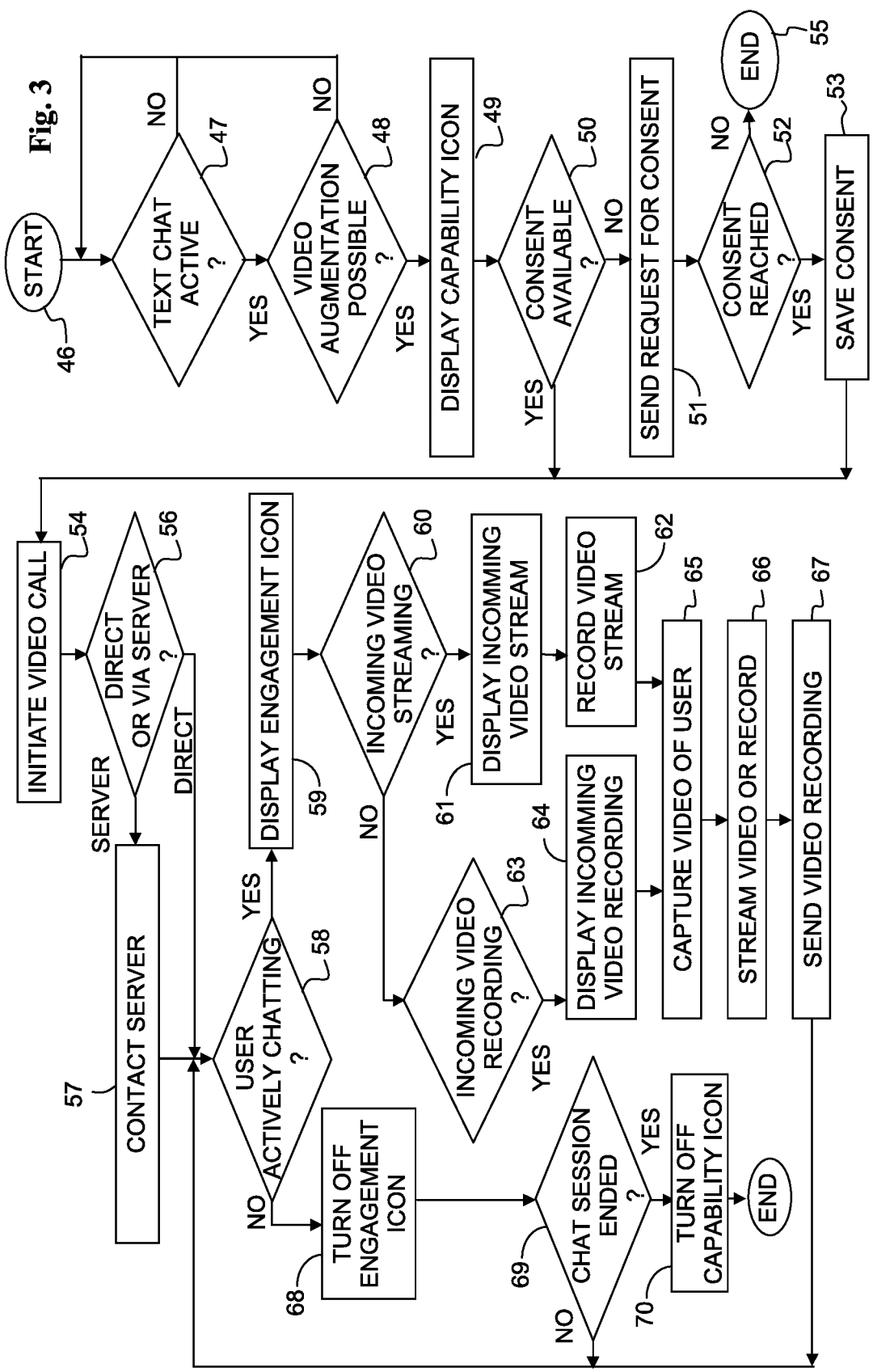
FIG. 3 is a simplified flow chart of the media-augmenting software program for the media-augmenting terminal.

Reference is now made to FIG. 3, which is a simplified flow chart of the media-augmenting software program 34 according to a preferred embodiment of the present invention.

More particularly but not exclusively, FIG. 3 represents the video augmentation module 41. However, other functions of the media-augmenting software program 34 may be included in FIG. 3 and described herein.

It is appreciated that video augmentation module 41 is not restricted to managing video augmentation of text chat session, and can manage media other then video augmenting media other then text chat.

As seen in FIG. 3, the video augmentation module 41 start in step 46 and then in step 47 preferably checks if a text chat session is active. If the chat session is active the video augmentation module 41 preferably proceeds to step 48 to check if video augmentation is possible. For example, video augmentation is possible if both parties of the text chat are equipped with video cameras (preferably mounted at the front of the mobile device and facing the user) and video communication capabilities.

If video augmentation is possible the video augmentation module 41 preferably proceeds to step 49 to display the video capability icon, and then to step 50 to check if consent is available. Consent is available, for example, if both parties have agreed in the past to engage in a video augmented text chat and this consent holds until revoked by one of the parties. If consent is not available, the video augmentation module 41 preferably proceeds to step 51 to send a request for consent to the other party. After exchanging requests and consent messages, and if consent is reached (step 52) video augmentation module 41 preferably proceeds to step 53 to save the consent for future occasions and to initiate the video augmenting call (step 54). Otherwise, if consent is not reached, the procedure ends (step 55).

The video augmentation module 41 preferably proceeds to step 56 to check if a server is used to exchange the video content. If a server should be used the server is contacted in step 57. There are the following typical situations or mechanisms for exchanging video transmission:

A. Streaming video, where video is captured by the first terminal, immediately sent to the other terminal(s) and immediately displayed by the other terminal(s). Optionally, the receiving terminal(s) may also store the received video or a part of the received video stream, such as the last 20 seconds. The receiving terminal can then display the stored video content whenever fresh streaming video is not available.

B. Streaming video, where video is captured by the first terminal, immediately sent to the other terminal(s) and is stored by the other terminal(s) for a later display. This may be typical to situation where the user of the receiving terminal is not actively using the terminal when the video is received.

C. Streaming video, where video is captured by the first terminal, immediately sent to the server (such as server 14 of FIG. 1), and is stored by the server to be retrieved by the other terminal(s). This may be typical to situation where the user of the receiving terminal is not actively using the terminal when the video is received, and the receiving terminal does not have storage adequate to store the video stream.

D. Recorded video, where the sending terminal captures the video and stores it internally. The video is then sent as a message or as a recorded video. This may be typical to situations where the sending user prefers to control the sending of the video. Typically, the video is sent together with the text chat content.

E. Recorded video, where the sending terminal captures the video and stores it internally and later sends the video content to a server (such as server 14 of FIG. 1), to be forwarded to the receiving party when appropriate. Typically, the video is sent together with the text chat content.

It is appreciated that video is either sent substantially concurrently with the text chat content, or is received substantially concurrently with (or in parallel to) the text chat content, or both.

As seen in FIG. 3, the video augmentation module 41 preferably proceeds to step 58 to check if the user is actively using the terminal, preferably chatting, preferably chatting with the party with which a video augmented text chat session is active.

Various mechanisms and procedures are preferably available to determine and/or identify, and/or recognize and/or detect user activity, and particularly that the user is actively associated with the relevant text chat session. Such mechanisms and procedures include, but are not limited to:

Detecting that the user is moving the terminal.
  Detecting that the user is using the terminal to enter text.
  Detecting the user's face in a picture taken by the camera.
  Detecting a terminal wakeup.

A special case of activating video augmentation is when both parties are actively associated with the text chat session.

If the user is actively chatting the video augmentation module 41 preferably proceeds to step 59 to display the engagement icon and then to step 60.

In step 60 video augmentation module 41 preferably checks if video streaming is possible (by either terminals) and available (streaming from the other terminal). If video streaming is possible and available the video augmentation module 41 preferably proceeds to step 61 to display the incoming video stream. Optionally, the received video stream is also recorded, in whole or in part (step 62). For example, the last 20 seconds of the received video stream is stored.

If streaming is not available, video augmentation module 41 preferably retrieves and displays recorded incoming video (steps 63 and 64). Such recorded video content can be obtained as streaming video that was internally recorded earlier. Alternatively, the video content was received as a video message or a similar near real-time video. Alternatively, the video content is retrieved from a server (such as server 14 of FIG. 1).

The video augmentation module 41 preferably proceeds to step 65 to capture video content, preferably video content including the user. The video augmentation module 41 then preferably proceeds to step 66 to either stream the video content in real-time to the other terminal(s) or to the server or to store it internally for later delivery. When the user sends the text chat content or otherwise leave the text chat the video augmentation module 41 preferably proceeds to step 67 to send the recorded video content (if video content was recorded internally in step 66.

In step 58, if the user is no longer actively chatting, the video augmentation module 41 preferably proceeds to step 68 to turn off the engagement icon. If the chat session has ended (step 69) for example by discontinuing the video session, the video augmentation module 41 preferably proceeds to step 70 to turn off the capability icon and then ends.

Thus, the software program 34, and preferably the video augmentation module 41 preferably perform a method for initiating a video call between parties while the parties are engaged in a text chat session. Preferably, the program executes the steps of:
- reaching consent between the parties to engage in a video session while in a text chat session;
- performing at least one of:
  - identifying user activity associated with the text chat session;
  - initiating video recording associated with the text chat session; and
  - sending the video recording in parallel to a text message associated with the text chat session; and
- receiving a text message and a video recording associated with the text chat session;
- identifying user activity associated with the text chat session; and
- displaying the video recording in parallel with the user activity.

It is expected that during the life of this patent many relevant methods and systems will be developed and the scope of the terms herein, particularly of the terms "wireless communication technology", "text chat" and "video conferencing" are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for augmenting a communication session, comprising:
    initiating, from a first terminal of a first party, a text chat session with a second terminal of a second party;
    identifying user activity of the first party at the first terminal associated with the text chat session; and
    automatically activating a video call session with the second terminal of the second party, based on initiation of the text chat session and consent by the first and second parties, while the user is actively associated with the text chat session.

2. The method of claim 1, further comprising:
    reaching consent, during the text chat session, between the first and second parties to automatically engage in the video call session while in the text chat session.

3. The method of claim 1, further comprising:
    accessing the consent in a storage of the first terminal, the consent being reached during a previous communication session between the first and second parties.

4. The method of claim 1, wherein the activating further comprises:
    activating the video call session in response to the first party and the second party being actively associated with the text chat session.

5. The method of claim 1, wherein the identifying further comprises:
    detecting that the user is inputting text to the text chat session at the first terminal.

6. The method of claim 1, further comprising:
    recording a video message in response to the automatic activation of the video call session; and
    transmitting the video message to a remote server for storage until a user of the second terminal is identified to be actively using the second terminal, the video message being transmitted in parallel with a text message of the text chat session.

7. The method of claim 1, further comprising:
    receiving a video message from the second terminal;
    storing the received video message for display until detection of user activity of the first terminal associated with the text chat session; and
    displaying the stored video message in response to identifying the user activity at the first terminal.

8. The method of claim 1, further comprising:
    receiving a video message from the second terminal; and
    automatically displaying the received video message upon receipt during the identified user activity.

9. A wireless communications device, comprising:
    a wireless communications unit configured to communicate text and video data to a second wireless communications device;
    a text communication module configured to receive text input from a user for transmission to the second wireless communications device during a text chat session;

a video communication module configured to activate, in response to initiation of the text chat session and consent by parties of the wireless communications device and the second wireless communications device, a video call session with the second wireless communications device during the text chat session; and a processor configured to execute the text communication module and the video communication module.

10. The wireless communications device of claim 9, further comprising:
a storage device configured to store the consent, the consent being reached during a previous communication session between the wireless communications device and the second wireless communications device.

11. The wireless communications device of claim 9, wherein the video communication module is further configured to detect that the user is providing the text input at the wireless communications device.

12. The wireless communications device of claim 11, further comprising:
a storage device configured to store video data, wherein:
the wireless communications unit is further configured to receive a video message from the second wireless communications device during the video call session; and
the video communications module is further configured to store the received video message for display until detection of the user providing the text input, and display the stored video message in response to the detection of the user providing the text input at the wireless communications device.

13. The wireless communications device of claim 9, further comprising:
a storage device configured to store video data, wherein:
the video communication module is further configured to record a video message in the storage device in response to the automatic activation of the video call session; and
the wireless communications unit is further configured to transmit the video message to a remote server for storage until a user of the second wireless communications device is identified to be actively using the second wireless communications device, the video message being transmitted in parallel with a text message of the text chat session.

14. The wireless communications device of claim 9, wherein:
the wireless communications unit is further configured to receive a video message from the second wireless communications device during the video call session; and
the video communications module is further configured to automatically display the received video message upon receipt while the user is engaged with the wireless communications device.

15. The wireless communications device of claim 9, wherein:
the text communication module is further configured to receive text input from the user for transmission to a third wireless communications device during the text chat session; and
the video communication module is further configured to automatically include the third wireless communications device in the video call session with the second wireless communications device during the text chat session based on consent by parties of the wireless communications device, the second wireless communications device, and the third wireless communications device.

16. A computer program product having a non-transitory computer readable medium tangibly recording computer program logic for augmenting a communication session, the computer program product comprising:
code to initiate, from a first terminal of a first party, a text chat session with a second terminal of a second party;
code to identify user activity of the first party at the first terminal associated with the text chat session; and
code to automatically activate a video call session with the second terminal of the second party, based on initiation of the text chat session and consent by the first and second parties, while the user is actively associated with the text chat session.

17. The computer program product of claim 16, further comprising:
code to reach consent, during the text chat session, between the first and second parties to automatically engage in the video call session while in the text chat session.

18. The computer program product of claim 16, further comprising:
code to access the consent in a storage of the first terminal, the consent being reached during a previous communication session between the first and second parties.

19. The computer program product of claim 16, wherein the code to identify further comprises:
code to detect that the user is inputting text to the text chat session at the first terminal.

20. The computer program product of claim 16, further comprising:
code to record a video message in response to the automatic activation of the video call session; and
code to transmit the video message to a remote server for storage until a user of the second terminal is identified to be actively using the second terminal, the video message being transmitted in parallel with a text message of the text chat session.

* * * * *